United States Patent
Maercovich

(10) Patent No.: US 8,292,257 B2
(45) Date of Patent: Oct. 23, 2012

(54) METHOD AND ARRANGEMENT FOR CONTROLLING FLUSH WATER VOLUME

(76) Inventor: Jorge Maercovich, Woodland Hills, CA (US)

( * ) Notice: Subject to any disclaimer, the term of this patent is extended or adjusted under 35 U.S.C. 154(b) by 963 days.

(21) Appl. No.: 12/315,119

(22) Filed: Nov. 28, 2008

(65) Prior Publication Data

US 2010/0132103 A1     Jun. 3, 2010

(51) Int. Cl.
*F16K 31/12*      (2006.01)
(52) U.S. Cl. ................................ 251/40; 137/269
(58) Field of Classification Search .............. 251/40, 251/42; 137/15.19, 269; 4/324
See application file for complete search history.

(56) References Cited

U.S. PATENT DOCUMENTS

| | | | | |
|---|---|---|---|---|
| 1,624,130 A | * | 4/1927 | Beggs | 251/21 |
| 2,181,900 A | * | 12/1939 | Langdon | 251/38 |
| 2,612,187 A | * | 9/1952 | Romanelli et al. | 251/40 |
| 2,620,826 A | * | 12/1952 | Johns | 251/40 |
| 2,738,946 A | * | 3/1956 | Filliung | 251/35 |
| 2,858,846 A | * | 11/1958 | Parker | 137/359 |
| 3,406,940 A | * | 10/1968 | Kertell | 251/40 |
| 3,806,962 A | * | 4/1974 | Sievers | 137/636.1 |
| 5,026,021 A | * | 6/1991 | Pino | 251/40 |
| 6,227,219 B1 | * | 5/2001 | Pino | 137/1 |

* cited by examiner

*Primary Examiner* — Eric Keasel
*Assistant Examiner* — Matthew W Jellett
(74) *Attorney, Agent, or Firm* — Raymond Y. Chan; David and Raymond Patent Firm

(57) ABSTRACT

A flush water volume control arrangement includes a replacement member for interchangeably replacing a conventional pusher member and for being slidably coupled with a valve body, wherein the replacement member has a sized configuration different from a sized configuration of the conventional pusher member and is adapted for being actuated by a flush actuator to push at a flushing shaft so as to complete a flushing operation with a relatively low volume of water lower than the volume of flush water through the conventional pusher member.

32 Claims, 9 Drawing Sheets

METHOD AND ARRANGEMENT FOR CONTROLLING FLUSH WATER VOLUME

BACKGROUND OF THE PRESENT INVENTION

1. Field of Invention

The present invention relates to a flush system, and more particularly to a method and arrangement for controlling flush water volume during a flushing operation.

2. Description of Related Arts

Urinal and toilet flush systems have been well-known as one of the most significant inventions in the last century. A conventional toilet or urinal flush system comprises a valve body having a water inlet and a water outlet, a diaphragm having a water channel communicating between the water inlet and the water outlet, a relief valve disposed at the diaphragm for blocking the water flowing from the water inlet to the water outlet through the water channel, and a flush actuator arranged to move the relief valve at a position where the water is allowed flow to the water outlet for completing the flushing operation.

Conventionally, the relief valve has a pivotal pin member longitudinally and downwardly extended therefrom in the water channel, whereas the flush actuator comprises an elongated actuating member transversely and pivotally extended from the valve body, and a pusher pin transversely and movably extended in the valve body to align with the pivotal pin, in such a manner that when the elongated actuating member is pivotally moved in a predetermined direction (such as a downward direction with respect to the valve body), the pusher pin is transversely pushed to drive the pivotal pin to pivotally move within the valve body so as to open the relief valve for allowing water flowing through water channel. As a result, a user is able to flush the toilet by actuating the flush actuator.

A major drawback for this conventional toilet flush system is that the user is unable to control the volume of water flow so that unnecessary waste of water is prevalent. In other words, the conventional flush system will allow a standard time and volume of flushing regardless of purpose thereof. For example, when the user wishes to flush away a certain piece of toilet paper in the toilet bowl, he or she is unable to adjust the volume of flushing water so that the flushing cycle in this particular instance is exactly the same as any usual flushing cycle for this particular flush system. This is obviously undesirable from environmental as well as economical point of view.

There exist several types of flush systems which include certain types of water adjustment mechanisms which are claimed to be capable of controlling the volume of water during a typical flush cycle. However, the major problem for these kinds of water adjustment mechanisms is that their efficacy of effectively controlling the volume of flushing water among a plurality of operation modes is in doubt. For example, a conventional flush system equipped with a conventional water adjustment mechanism may have two modes of operations, namely a regular flush cycle and a water-saving flush cycle, in which the latter is supposed to require less water than the former. However, the reality is that very often, there is no noticeable or significant difference in water consumption between these two modes of operations so that there is no practical distinction between these two modes of operations. From engineering point of view, when the water adjustment mechanism produces no significant difference in water consumption, there is actually no reason or incentive to produce a flush system having such a water adjustment mechanism because it will certainly increase the manufacturing cost of that flush system.

It is submitted that the main reason for this ineffectiveness in controlling the volume of flush water is that one is hard to accurately control the period for which the relief valve is opened by one single actuating member. Thus, it is possible that the time of opening the relief valve in the two modes of operations is very much the same so that there is no noticeable difference in water volume between these two modes of operation.

SUMMARY OF THE PRESENT INVENTION

A main object of the present invention is to provide a method and arrangement for controlling flush water volume during a flushing operation.

Another object of the present invention is to provide a method and arrangement for controlling flush water volume, wherein the flush water volume is simply controlled by two different pusher members. Accordingly, a first pusher member is used for controlling the flushing operation with a relatively high flush water volume. Once the first pusher member is replaced by a second pusher member, the second pusher member is used for controlling the flushing operation with a relatively low flush water volume.

Another object of the present invention is to provide a method and arrangement for controlling flush water volume, wherein the flush water volume can be precisely controlled by moving one of the first and second pusher members to move the flushing shaft for opening the valve seat, as the convention flushing operation. In other words, by controlling the time period of the valve seat 20 being stayed at the flushing position, the flush water volume can be controlled.

Another object of the present invention is to provide a method and arrangement for controlling flush water volume, wherein the operations of the first and second pusher members are the same as the operation of the conventional pusher member for completing the flushing operation. In other words, the user is able to perform the same actuating operation to complete the flushing operation with selected flush water volume.

Another object of the present invention is to provide a method and arrangement for controlling flush water volume, wherein the arrangement is adapted for incorporating with the conventional toilet or urinal flush system. Accordingly, for toilet flush system, the first pusher member can be used for controlling the flushing operation with a relatively high flush water volume. For urinal flush system, the second pusher member can be used for controlling the flushing operation with a relatively low flush water volume.

Another object of the present invention is to provide a method and arrangement for controlling flush water volume, which does not in any way interfere with a normal operation of the flush system (except an adjustment of the volume of flush water), so as to allow the arrangement to be incorporated into a wide range of conventional flush systems without undue burden on the part of flush system manufacturers. In other words, the present invention can be kept to have the minimal manufacturing cost.

Another object of the present invention is to provide a method and arrangement for controlling flush water volume, wherein no expensive or complicated structure is required to employ in the present invention in order to achieve the above mentioned objects. Therefore, the present invention successfully provides an economic and efficient solution for providing a method and arrangement for controlling flush water volume.

Accordingly, in order to accomplish the above objects, the present invention provides a flush system, comprising:

a valve body having a water inlet and a water outlet;

a valve seat supported in the valve body between the water inlet and the water outlet, wherein the valve seat is adapted to move between a normal idle position that water is blocked to flow from the water inlet to the water outlet and a flushing position that the water is allowed to flow from the water inlet to the water outlet so as to complete a flushing operation;

a flushing shaft extended from the valve seat to move the valve seat between the idle position and the flushing position, wherein the flushing shaft defines a first position and a second position; and a flush water volume control arrangement, which comprises:

a flush actuator movably coupled with the valve body;

a first pusher member slidably supported at the valve body and alignedly extended towards the first position of the flushing shaft, wherein when the flush actuator is actuated to shift the first pusher member, the first pusher member is actuated to push at the first position of the flushing shaft to complete the flushing operation with a relatively high volume of water; and a second pusher member, which is a replacement member to replace the first pusher member to slidably support at the valve body, wherein the second pusher member is alignedly extended towards the second position of the flushing shaft, such that when the flush actuator is actuated to shift the second pusher member, the second pusher member is actuated to push at the second position of the flushing shaft to complete the flushing operation with a relatively low volume of water.

The present invention further provides a method for controlling flush water volume, comprising the steps of:

(a) selectively coupling one of first and second pusher members at a valve body;

(b) when the first pusher member is slidably coupled at the valve body, actuating a flush actuator to shift the first pusher member, wherein the first pusher member is actuated to push at a first position of a flushing shaft to complete a flushing operation with a relatively high volume of water;

(c) replacing the first pusher member with the second pusher member to slidably couple at the valve body, wherein when the flush actuator is actuated to shift the second pusher member, the second pusher member is actuated to push at a second position of the flushing shaft to complete the flushing operation with a relatively low volume of water.

These and other objectives, features, and advantages of the present invention will become apparent from the following detailed description, the accompanying drawings, and the appended claims.

DETAILED DESCRIPTION OF THE PREFERRED EMBODIMENT

Figure 1:
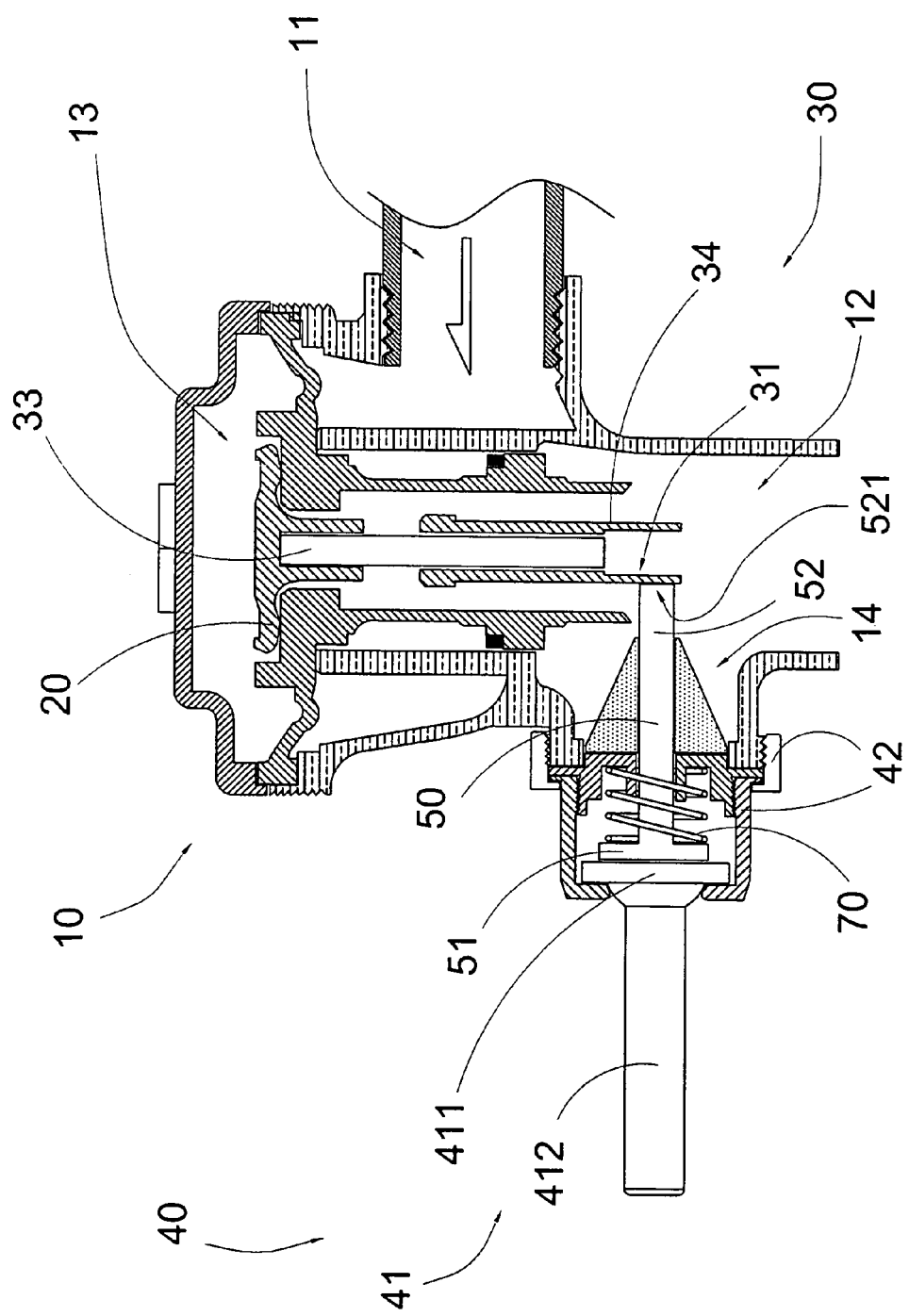
FIG. 1 is a sectional view of a flush system with a flush water volume control arrangement according to a preferred embodiment of the present invention, illustrating the flush system incorporating with a first pusher member for completing the flushing operation with a relatively high flush water volume.

Referring to FIGS. 1 to 7, a flush water volume control arrangement for a flush system according to a preferred embodiment of the present invention is illustrated, in which the flush system for a toilet or urinal flush system comprises a valve body 10, a valve seat 20, and a flushing shaft 30.

The valve body 10 has a water inlet 11 communicating with a water source, a water outlet 12, and a water chamber 13 communicating between the water inlet 11 and the water outlet 12.

The valve seat 20 is supported in the valve body 10 to move between a normal idle position and a flushing position, wherein at the idle position, the valve seat 20 is sealed at the water chamber 13 for retaining a water pressure within the water chamber 13 so as to block flush water flowing from the water inlet 11 to the water outlet 12, wherein and at the flushing position, the valve seat 20 is moved to relief the water pressure for allowing the flush water flowing towards the toilet through the water outlet 12 so as to complete a flushing operation.

The flushing shaft 30 is extended from the valve seat 20 in the valve body 10 for being moved to drive the valve seat 20 to move between the idle position and the flushing position, wherein the flushing shaft 30 defines a first position 31 and a second position 32. Furthermore, the flushing shaft 30 comprises a main shaft member 33 and a movable pin 34 movably provided on a lower portion thereof so that the movable pin 34 is capable of longitudinally moving along the flushing shaft 30 with respect to the main shaft member 33. Accordingly, the first position 31 of the flushing shaft 30 is a position higher than the second position 32 of the flushing shaft 30.

The flush water volume control arrangement comprises a flush actuator 40 movably coupled with the valve body 10, a first pusher member 50, and a second pusher member 60.

The first pusher member 50 is slidably supported at the valve body 10 and is alignedly extended towards the first position 31 of the flushing shaft 30, wherein when the flush actuator 40 is actuated to shift the first pusher member 50, the first pusher member 50 is actuated to push at the first position 31 of the flushing shaft 30 to complete the flushing operation with a relatively high volume of water.

The second pusher member 60 is a replacement member to replace the first pusher member 50 to slidably support at the valve body 10. Accordingly, the first and second pusher members 50, 60 have different sized configurations. When the first pusher member 50 is replaced by the second pusher member 60, the second pusher member 60 is alignedly extended towards the second position 32 of the flushing shaft 30, such that when the flush actuator 40 is actuated to shift the second pusher member 60, the second pusher member 60 is actuated to push at the second position 32 of the flushing shaft 30 to complete the flushing operation with a relatively low volume of water.

According to the preferred embodiment, the valve body 10 further has an operation opening 14 communicating with the water chamber 13, wherein the flush water volume control arrangement is detachably coupled with the valve body 10 at the operation opening 14.

As shown in FIG. 1, the flush actuator 40 comprises an actuator handle 41 operatively coupling with the first or second pusher member 50, 60 and a valve locker 42, having a ring shape, detachably locking at the operation opening 14 of the valve body 10 to retain the actuator handle 41 thereat in a movable manner with an arc-path for activating the flushing operation. Accordingly, the actuator handle 41 comprises an enlarged actuating platform 411 disposed in the valve locker 42 and an elongated manual handle 412 extended from the actuating platform 411 for the user to actuate at the arc-path. It is worth to mention that when the manual handle 412 is actuated, the first pusher member 50 or the second pusher member 60 is driven to slide towards the flushing shaft 30.

The valve locker 42 is a locking ring adapted for rotatably locking at the rim of the actuation opening 14 of the valve body 10. Therefore, in order to interchange the first pusher member 50 with the second pusher member 60, the user is able to unscrew the valve locker 42 from the valve body 10 to remove the first pusher member 50 from the valve body 10. Then, the user is able to replace the first pusher member 50 with the second pusher member 60 and screw the valve locker 42 back to the valve body 10 so as to install the second pusher member 60 into the valve body 10.

Figure 7A:
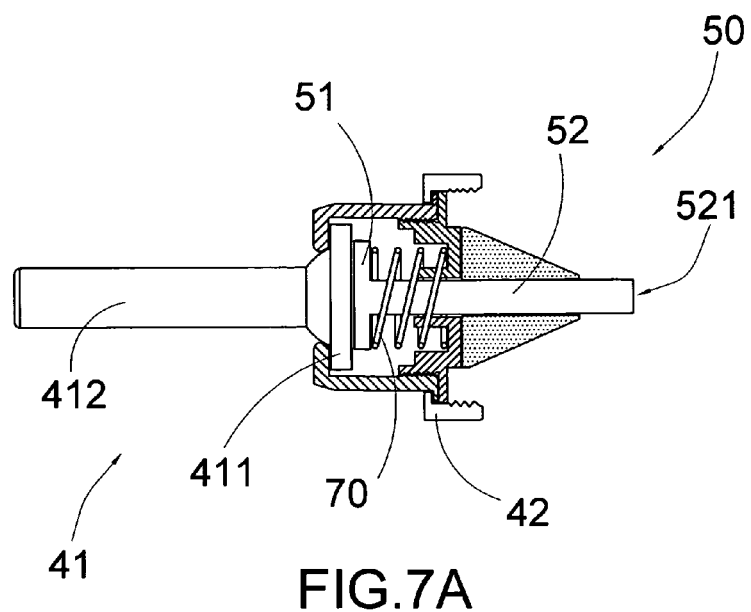
FIGS. 7A and 7B illustrate the first and second pusher members of the flush water volume control arrangement respectively according to the preferred embodiment of the present invention.

As shown in FIGS. 1 and 7A, the first pusher member 50, which is slidably extended from the operation opening 14 of the valve body 10 towards the flushing shaft 30, comprises an enlarged first biasing base 51 actuated by the actuating platform 411 of the actuator handle 41 and an elongated first driving member 52 extended from the first biasing base 51 at a position that a first pusher end 521 of the first driving member 52 is aligned to the first position 31 of the flushing shaft 30.

Figure 2:
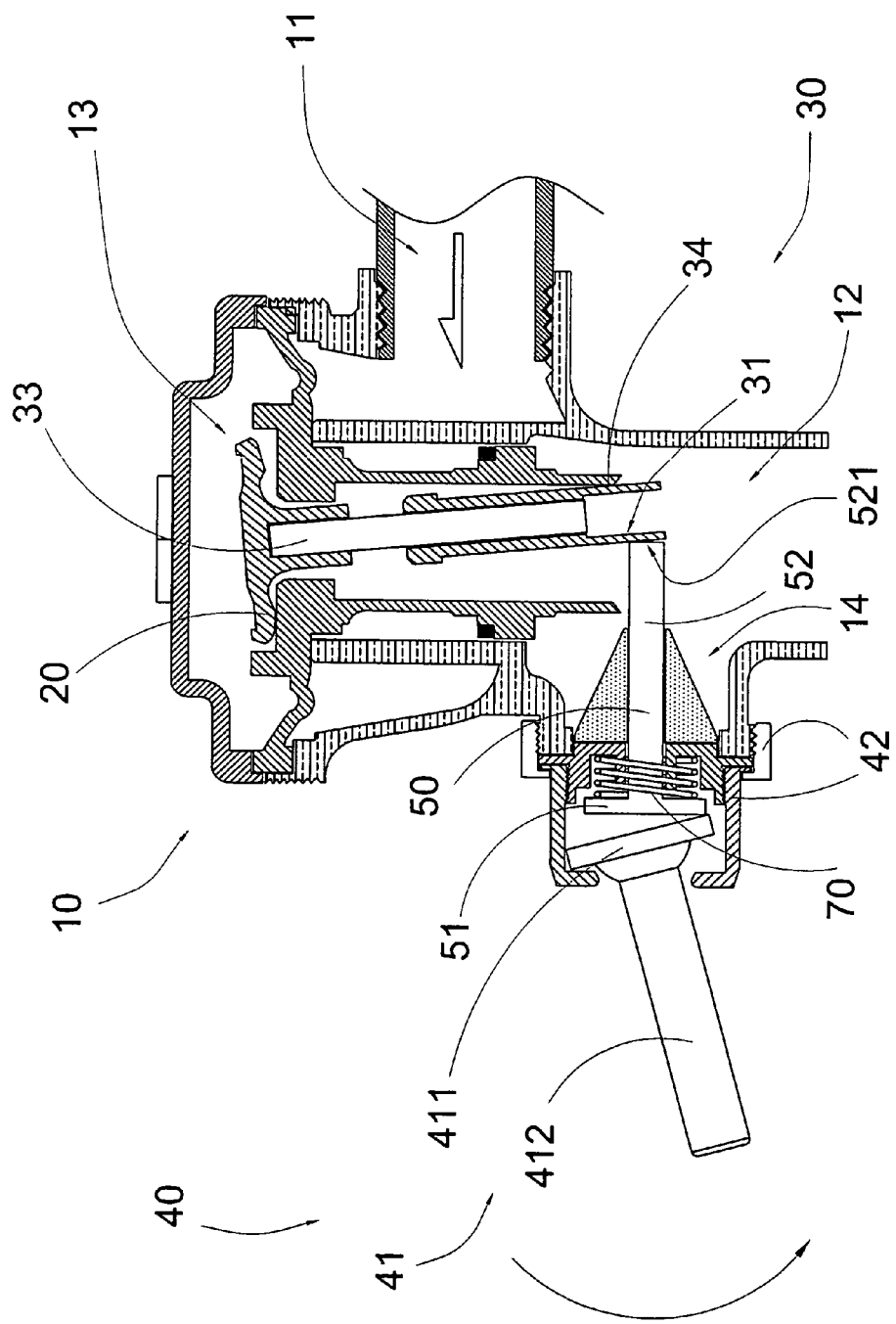
FIG. 2 is a sectional view of the flush system according to the above preferred embodiment of the present invention, illustrating the flush actuator being actuated to start the high flush water flushing cycle.

When the user actuates the manual handle 412 of the actuator handle 41, as shown in FIG. 2, the first driving member 52 is driven to slidably shift at the valve body 10 until the first pusher end 521 of the first driving member 52 hits at the first position 31 of the flushing shaft 30, such that the valve seat 20 is driven to move by the flushing shaft 30 from the idle position to the flushing position for allowing the flush water flowing towards the water outlet 12 so as to start the flushing operation.

Figure 3:
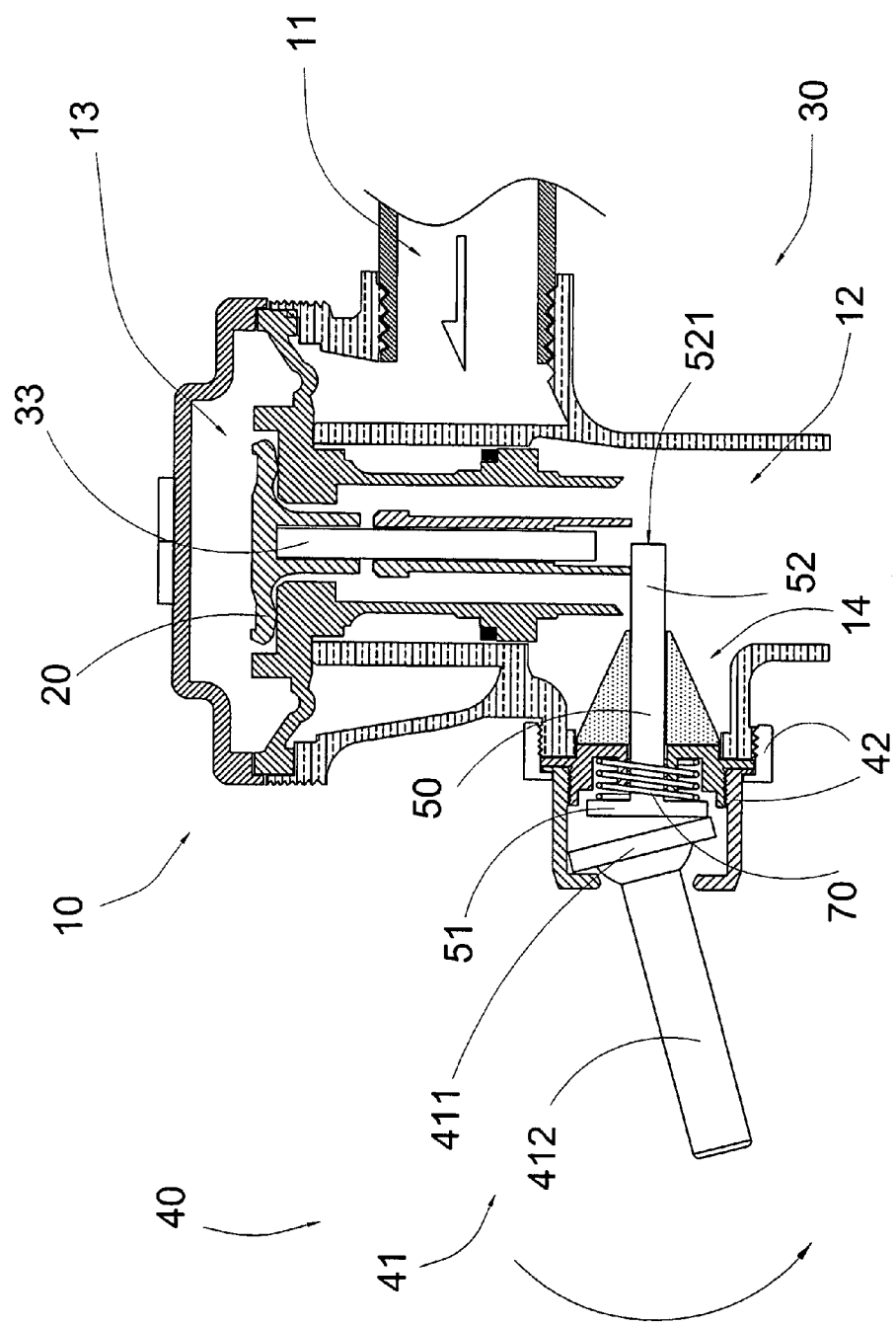
FIG. 3 is a sectional view of the flush system according to the above preferred embodiment of the present invention, illustrating the flush actuator being actuated to complete the high flush water flushing cycle.

It is worth mentioning that when the first driving member 52 is pushed to bias against the flushing shaft 30, the movable pin 34 is arranged to be pushed to move upwardly along the flushing shaft 30 while the main shaft member 33 is pivotally pushed to open the valve seat 20 for allowing the water flowing through the valve body 10. When the movable pin 34 of the flushing shaft 30 is moved back to its vertical orientation, as shown in FIG. 3, the valve seat 20 is sealed back at its idle position to block the water flushing out of the water outlet 12 so as to complete the flushing operation.

Figure 4:
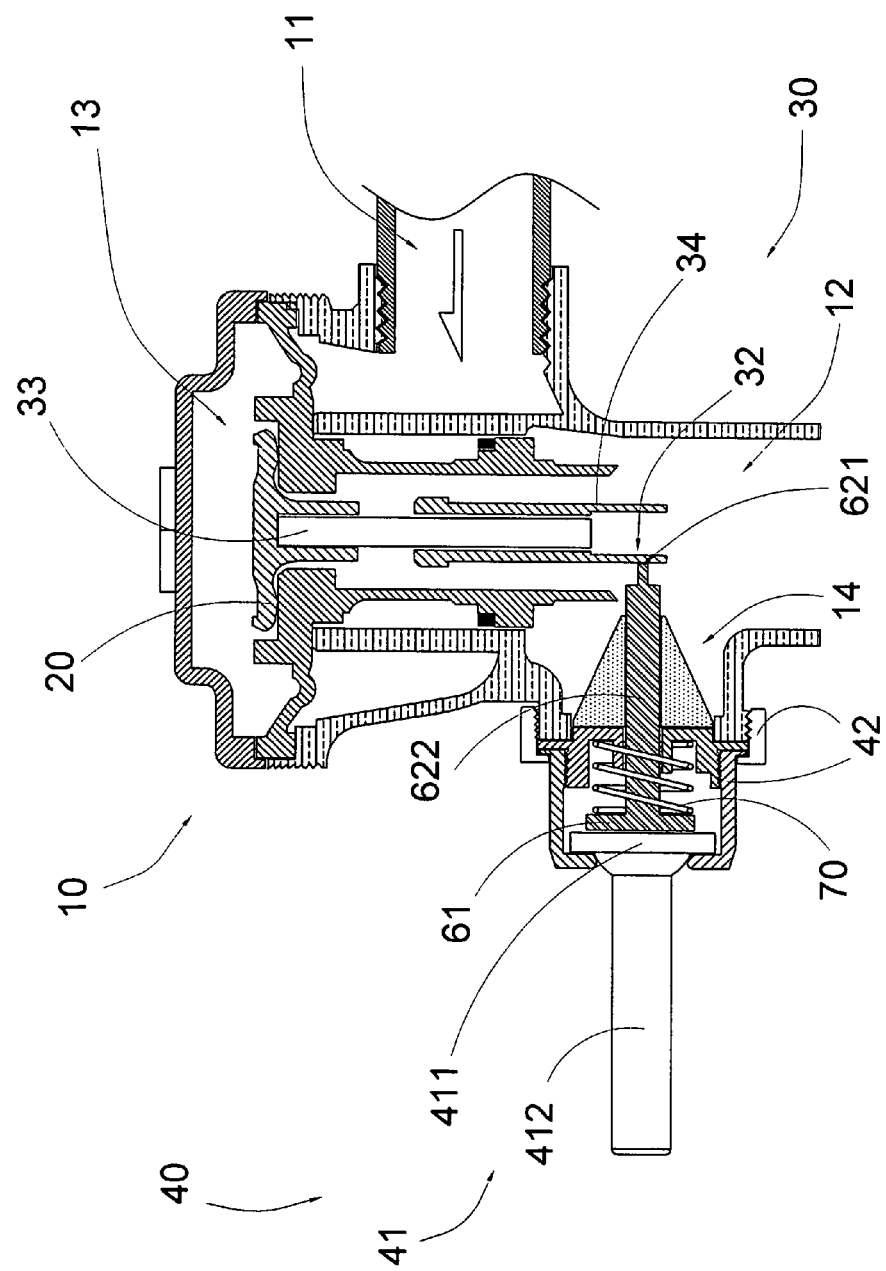
FIG. 4 is a sectional view of a flush system with a flush water volume control arrangement according to the preferred embodiment of the present invention, illustrating the flush system incorporating with a second pusher member for completing the flushing operation with a relatively low flush water volume.
Figure 7B:
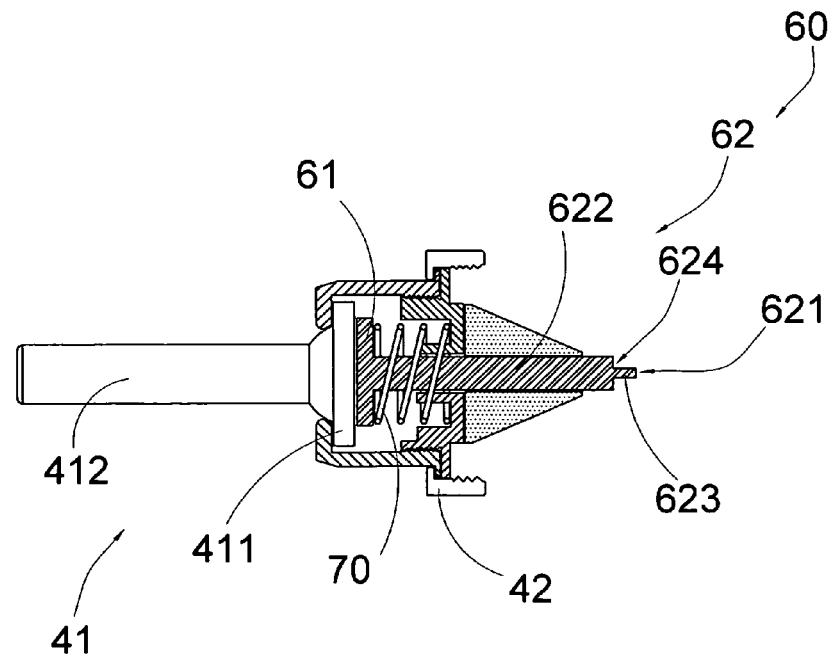

As shown in FIGS. 4 and 7B, the second pusher member 60, which is slidably extended from the operation opening 14 of the valve body 10 towards the flushing shaft 30, comprises an enlarged second biasing base 61 actuated by the actuating platform 411 of the actuator handle 41 and an elongated second driving member 62 extended from the second biasing base 61 at a position that a second pusher end 621 of the second driving member 62 is aligned to the second position 32 of the flushing shaft 30.

Figure 5:
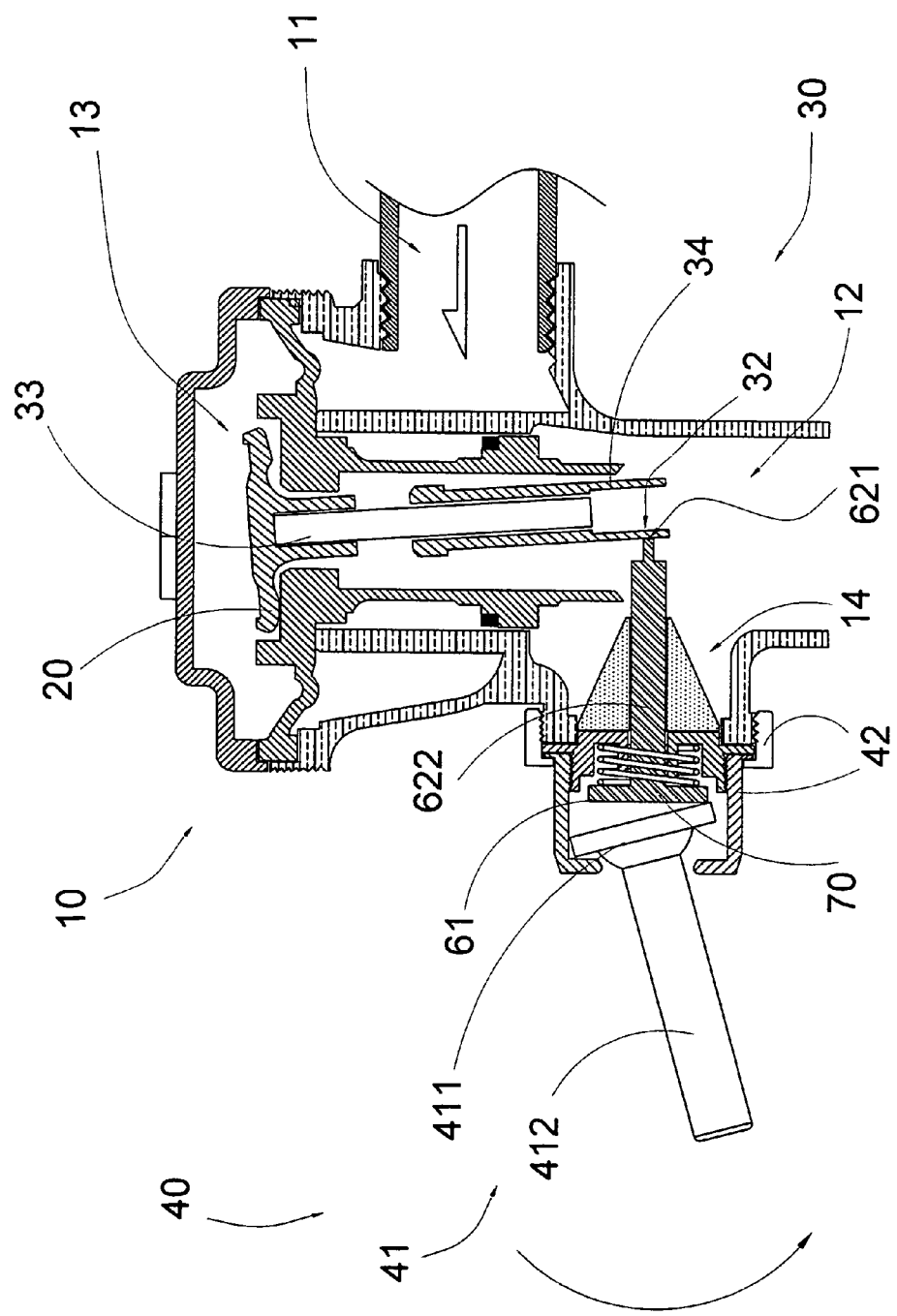
FIG. 5 is a sectional view of the flush system according to the above preferred embodiment of the present invention, illustrating the flush actuator being actuated to start the low flush water flushing cycle.

When the user actuates the manual handle 412 of the actuator handle 41, as shown in FIG. 5, the second driving member 62 is driven to slidably shift at the valve body 10 until the second pusher end 621 of the second driving member 62 hits at the second position 32 of the flushing shaft 30, such that the valve seat 20 is driven to move by the flushing shaft 30 from the idle position to the flushing position for allowing the flush water flowing towards the water outlet 12 so as to start the flushing operation.

Figure 6:
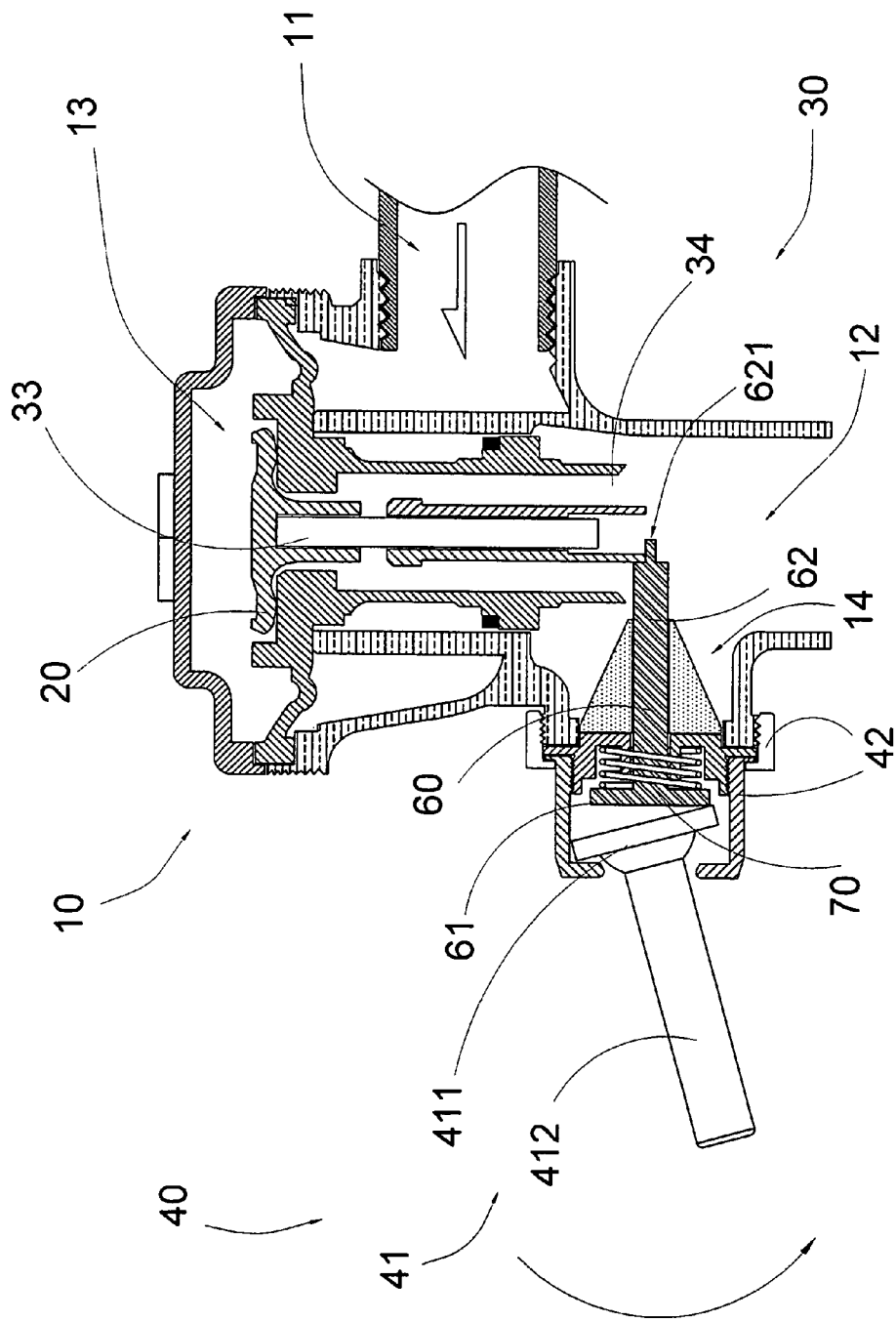
FIG. 6 is a sectional view of the flush system according to the above preferred embodiment of the present invention, illustrating the flush actuator being actuated to complete the low flush water flushing cycle.

It is worth mentioning that when the second driving member 62 is pushed to bias against the flushing shaft 30, the movable pin 34 is arranged to be pushed to move upwardly along the flushing shaft 30 while the main shaft member 33 is pivotally pushed to open the valve seat 20 for allowing the water flowing through the valve body 10. When the movable pin 34 of the flushing shaft 30 is moved back to its vertical orientation, as shown in FIG. 6, the valve seat 20 is sealed back at its idle position to block the water flushing out of the water outlet 12 so as to complete the flushing operation.

It is worth to mention that the operations of the first and second pusher members 50, 60 are the same by the actuation of the actuator handle 41. In order to precisely control the volume of the water to complete the flushing operation, the time period of the valve seat 20 being stayed at the flushing position should be concerned. In other words, the longer time of the valve seat 20 being stayed at the flushing position, the relatively higher volume of water is used for completing the flushing operation. Therefore, the shorter time of the valve seat 20 being stayed at the flushing position, the relatively lower volume of water is used for completing the flushing operation.

Accordingly, the time period of the valve seat 20 being stayed at the flushing position can be controlled by the time of the flushing shaft 30 being actuated to move back to its vertical orientation. In other words, when the movable pin 34 of the flushing shaft 30 is moved back to its vertical orientation, the valve seat 20 is sealed back at its idle position to block the water flushing out of the water outlet 12.

As it is mentioned above, the first and second pusher members 50, 60 have different sized configurations. As shown in FIGS. 7A and 7B, a diameter of the first pusher end 521 of the first driving member 52 is larger than a diameter of the second pusher end 621 of the second driving member 62. Accordingly, the first driving member 52 has a uniform diameter extended from the first biasing base 51 to its first pusher end 521. The second driving member 52 has a reduced diameter at the free end portion thereof to define the second pusher end 621 at the free end portion.

In other words, the second driving member 62 has a body portion 622 and a free end portion 623 coaxially extended therefrom to define the second pusher end 621 at the free end portion 623. In particularly, the first and second driving members 52, 62 are identical in diameter except the free end portions of the first and second driving members 52, 62. Accordingly, the body portion 622 of the second driving member 62 has a uniform diameter corresponding to the diameter of the first driving member 52, wherein the free end portion 623 of the second driving member 62 has a uniform diameter smaller than the uniform diameter of the body portion 622 of the second driving member 62 to define a shoulder edge 624 between the body portion 622 and the free end portion 623 of the second driving member 62. Therefore, the first position 31 of the flushing shaft 30 being hit by the first pusher end 521 of the first driving member 52 is higher than the second position 32 of the flushing shaft 30 being hit by the second pusher end 621 of the second driving member 62 as shown in FIGS. 2 and 5.

It is worth mentioning that when the second driving member 62 is driven to move by the flush actuator 40 to pivotally move the flushing shaft 30 at the second position 32, the movable pin 34 is shifted to return back to its vertical orientation to sit at the free end portion 623 of the second driving member 62 adjacent to the shoulder edge 624 thereof.

Preferably, the length of the first pusher member 50 is the same as the length of the second pusher member 60 such that the length of the first driving member 52 is the same as the length of the second driving member 62. In other words, the second pusher member 60 has a predetermined length matching with the length of the first pusher member 50.

When the first pusher member 52 is driven to move by the flush actuator 40 to pivotally move the flushing shaft 30 at the first position 31, the movable pin 34 requires longer time to return back to its vertical orientation, as shown in FIGS. 2 and 3. When the second pusher member 62 is driven to move by the flush actuator 40 to pivotally move the flushing shaft 30 at the second position 32, the movable pin 34 requires shorter time to return back to its vertical orientation, as shown in FIGS. 5 and 6. Therefore, by actuating one of the first and second pusher members 52, 62, the time period of the movable pin 34 returning back to its vertical orientation can be controlled so as to control the volume of water for completing the flushing operation.

As shown in FIGS. 1 and 4, the flush water volume control arrangement further comprises a resilient element 70 coaxially coupled with the one of the first and second pusher members 50, 60 to restoring an initial position thereof. Accordingly, the resilient element 70 is supported within the valve locker 42 to bias against the first or second biasing base 51, 61 of the first or second pusher member 50, 60 so as to push the first or second pusher member 50, 60 back away from the flushing shaft 30. In other words, when the first pusher member 50 is installed, the resilient element 70 will push the first pusher member 50 back after the flush actuator 40 is moved back to its original position. When the second pusher member 60 is installed, the resilient element 70 will push the second pusher member 60 back after the flush actuator 40 is moved back to its original position.

In order to enhance the replacement between the first and second pusher members 50, 60, the flush water volume control arrangement is preferred to form two sets of flush controls, as shown in FIGS. 7A and 7B. Accordingly, the first set is arranged to control the flushing operation for completing the flushing operation with a relatively high volume of water. The second set is arranged to control the flushing operation for completing the flushing operation with a relatively low volume of water.

The first set of the flush control comprises the flush actuator 40, the first pusher member 50, and the resilient element 70 pre-installed with each other. The second set of the flush control comprises the flush actuator 40, the second pusher member 60, and the resilient element 70 pre-installed with each other. In other words, the two sets of the flush controls comprises two flush actuators 40, the first pusher member 50, the second pusher member 60, and two resilient elements 70. In order to install the first set of flush control to the flush system, the user is able to detachably couple the valve locker 42 of the flush actuator 40 of the first set at the operation opening 14 of the valve body 10. Therefore, the first pusher member 50 is slidably extended through the operation opening 14 to the flushing shaft 30. In order to replace the first set of flush control, the user is able to detach the valve locker 42 of the flush actuator 40 of the first set. Then, the user is able to detachably couple the valve locker 42 of the flush actuator 40 of the second set at the operation opening 14 of the valve body 10. Therefore, the second pusher member 60 is slidably extended through the operation opening 14 to the flushing shaft 30.

It is worth to mention that the user is able to only replace the first pusher member 50 by the second pusher 60 while the flush actuator 40 and the resilient element 70 are remained the same.

Figure 8A:
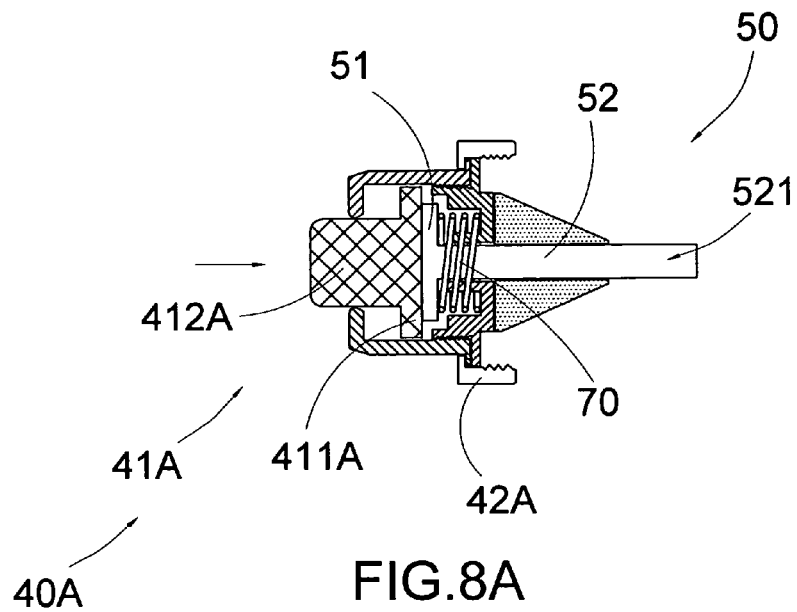
FIGS. 8A and 8B illustrate an alternative mode of the flush actuator to actuate the first and second pusher members according to the above preferred embodiment of the present invention.
Figure 8B:
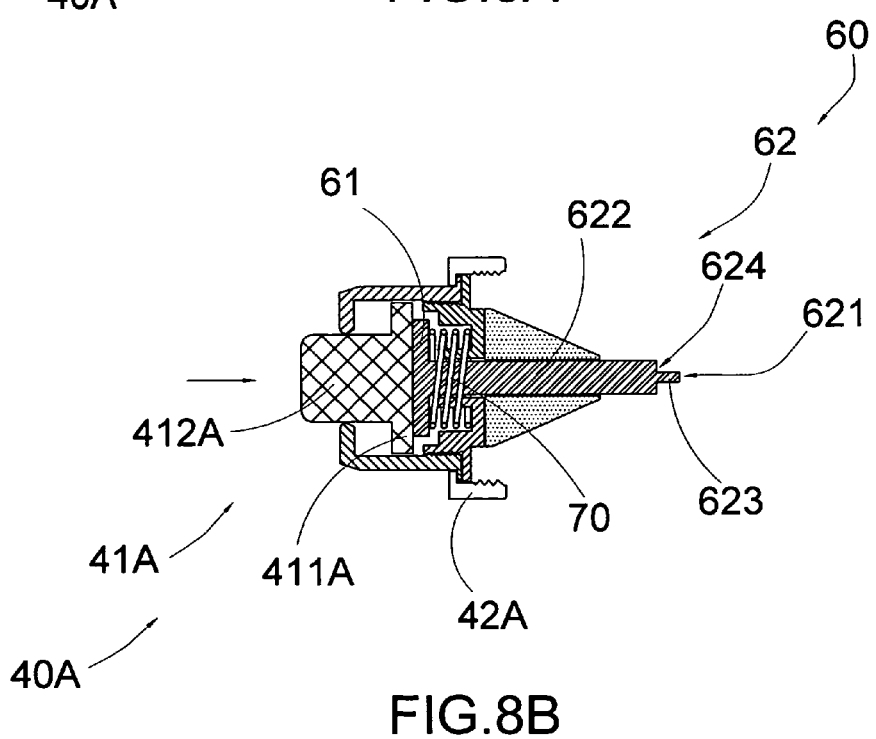

Accordingly, the flush water volume control arrangement can be incorporated with different types of actuators. FIGS. 8A and 8B illustrate an alternative mode of the flush actuator 40A which comprises an actuator button 41A and a valve locker 42A, having a ring shape, detachably locking at the operation opening 14 of the valve body 10 to retain the actuator button 41A thereat in a depressible manner for activating the flushing operation. Accordingly, the actuator button 41A comprises an enlarged actuating platform 411A disposed in the valve locker 42A and an elongated depressible button 412A extended from the actuating platform 411A for the user to press against the depressible button 412A. It is worth to mention that when the depressible button 412A is actuated, the first pusher member 50 or the second pusher member 60 is driven to slide towards the flushing shaft 30.

The valve locker 42A is a locking ring adapted for rotatably locking at the rim of the actuation opening 14 of the valve body 10. Therefore, in order to interchange the first pusher member 50 with the second pusher member 60, the user is able to unscrew the valve locker 42A and to replace the first pusher member 50 with the second pusher member 60. It is worth to mention that the first and second pusher members 50, 60 are shown in FIGS. 8A and 8B to illustrate the structural relationship between the flush actuator 40A and the first and second pusher members 50, 60 as two sets of flush controls. It is appreciated that the flush actuator 40A is also coupled with the first pusher member 50 as the second pusher member 60 when the second pusher member 60 is replaced by the first pusher member 50.

Figure 9:
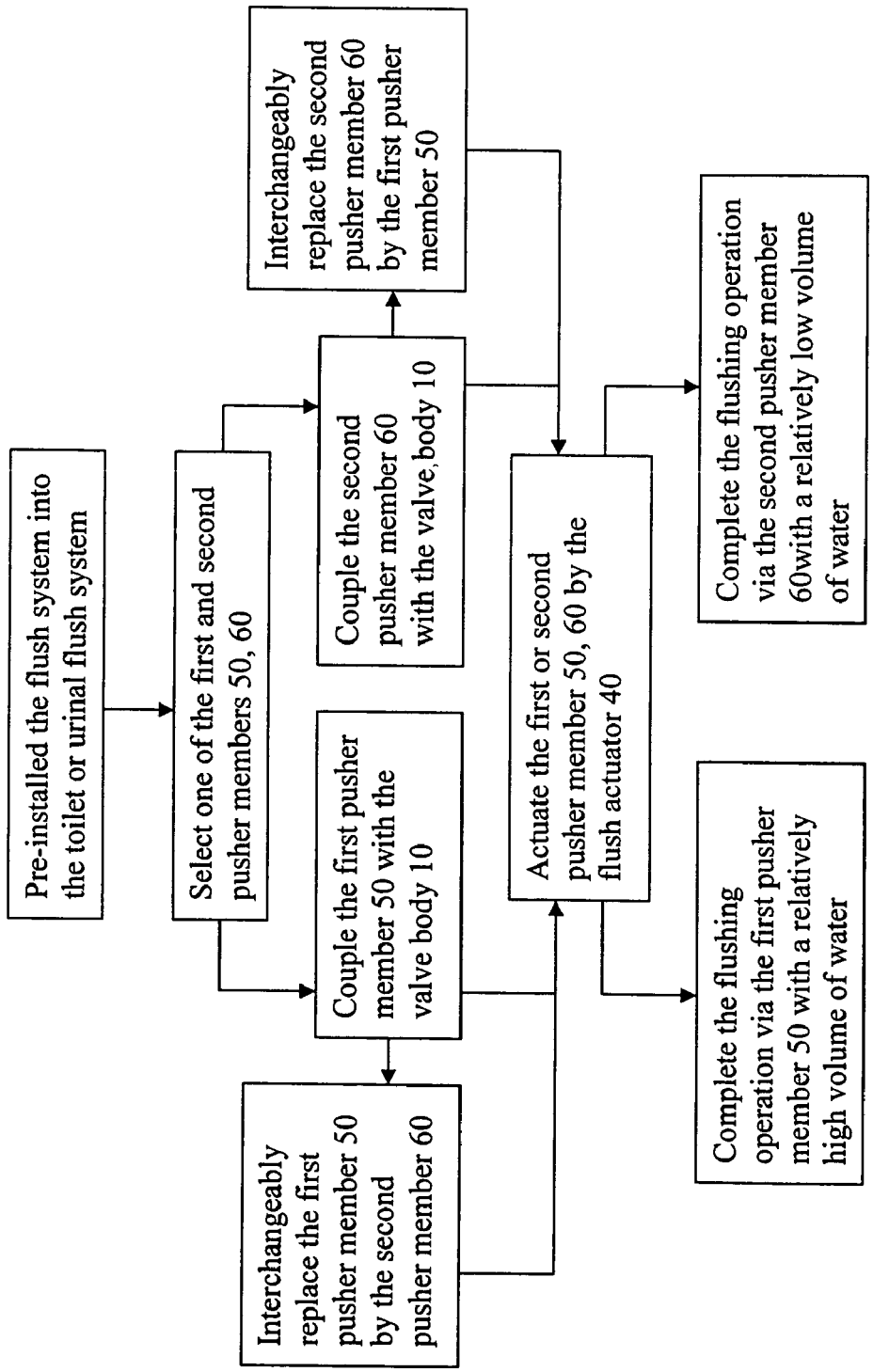
FIG. 9 is a flow diagram illustrating the method for controlling flush water volume according to the above preferred embodiment of the present invention.

As shown in FIG. 9, the method of the present invention for controlling flush water volume, comprising the following steps.

(1) Selectively couple one of the first and second pusher members 50, 60 at a valve body 10.

(2) When the first pusher member 50 is slidably coupled at the valve body 10, actuate the flush actuator 40 to shift the first pusher member 50, wherein the first pusher member 50 is actuated to push at the first position 31 of the flushing shaft 30 to complete the flushing operation with a relatively high volume of water.

(3) Replace the first pusher member 50 with the second pusher member 60 to slidably couple at the valve body 10, wherein when the flush actuator 40 is actuated to shift the second pusher member 60, the second pusher member 60 is actuated to push at the second position 32 of the flushing shaft 30 to complete the flushing operation with a relatively low volume of water.

Accordingly, before the step (1), the flush system is pre-installed into the toilet or urinal flush system such that the user is able to interchange the first pusher member 50 with the second pusher member 60 without disassembling the flush system.

In particularly, the step (3) of the present invention comprises the following steps.

(3.1) Detach the valve locker 42 from the valve body 10 to remove the first pusher member 50 from the valve body 10.

(3.2) Interchange the first pusher member 50 with the second pusher member 60.

(3.3) Re-couple the valve locker 42 back to the valve body 10 to install the second pusher member 60 into the valve body 10.

It is worth to mention that, in the step (3), the user is able to only interchange the first pusher member 50 with the second pusher member 60. Or the user is able to interchange the flush actuator 40, the first pusher member 50, and the resilient element 70 as the first set of flush control with the flush actuator 40, the second pusher member 60, and the resilient element 70 as the second set of flush control.

Accordingly, the entire structural configuration of the flush system will not be altered in order to incorporate with the flush water volume control arrangement of the present invention. Therefore, the user is able to incorporate the flush water volume control arrangement having the first pusher member 50 with the toilet flush system because the toilet flush system requires a relatively high volume of water to complete the flushing operation. Likewise, the user is able to incorporate the flush water volume control arrangement having the second pusher member 60 with the urinal flush system because the urinal flush system requires a relatively low volume of water to complete the flushing operation.

As it is mentioned above, the flush water volume control arrangement is adapted for incorporating with the conventional flush system. Accordingly, the conventional flush system comprises the valve body 10, the valve seat 20, the flushing shaft 30, the flush actuator 40, and the first pusher member 50 as the conventional pusher member. In other words, the first pusher member 50 can be the conventional pusher member, wherein the second pusher member 60 is modified to incorporate with the first pusher member 50.

The second pusher member 60 is embodied as the replacement member for interchangeably replacing the conventional pusher member 50 and for being slidably coupled with the valve body 10. The replacement member 60 has a sized configuration different from a sized configuration of the pusher member 50 and is adapted for being actuated by the flush actuator 40 to push at the flushing shaft 30 so as to complete the flushing operation with a relatively low volume of water lower than the volume of flush water through the conventional pusher member 50.

It is worth to mention again that the sized configuration of the replacement member 60 is different from the sized configuration of the conventional pusher member 50, wherein the diameter of the pusher end 621 of the replacement member 60 is smaller than that of the pusher end 521 of the conventional pusher member 50. On the other hand, the length of the replacement member 60 matches with the length of the conventional pusher member 50. In particularly, the replacement member 60 comprises the enlarged biasing base 61 and the elongated driving member 62 extended from the biasing base 61. The driving member 62 has the body portion 622 having a uniform diameter, and the free end portion 623 coaxially extended from the body portion 622 to define the pusher end 621 at the free end portion 623, wherein the free end portion 623 has the uniform diameter smaller that the uniform diameter of the body portion 622 to define the shoulder edge 624 between the body portion 622 and the free end portion 623 of the driving member 62.

For enhancing the replacement of the replacement member 60, the flush actuator 40 in the second set of the flush control is considered as a replacement flush actuator 40 for detachably coupling with the valve body 10. Therefore, the replacement member 60 is adapted for interchangeably replacing the conventional pusher member 50 when the valve locker 42 is detached from the valve body 10.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A flush system, comprising:

a valve body having a water inlet and a water outlet;

a valve seat supported in said valve body between said water inlet and said water outlet, wherein said valve seat is adapted to move between a normal idle position that water is blocked to flow from said water inlet to said water outlet and a flushing position that said water is allowed to flow from said water inlet to said water outlet so as to complete a flushing operation;

a flushing shaft extended from said valve seat to move said valve seat between said idle position and said flushing position, wherein said flushing shaft defines a first position and a second position; and a flush water volume control arrangement, which comprises:

a flush actuator movably and detachably coupled with said valve body; and two pusher members, one of said pusher members is selected to be slidably supported at said valve body;

wherein one of said pusher members is embodied as a first pusher member slidably supported at said valve body and alignedly extended towards said first position of said flushing shaft, wherein when said flush actuator is actuated to shift said first pusher member, said first pusher member is actuated to push at said first position of said flushing shaft to complete said flushing operation with a relatively high volume of water;

wherein another said pusher member is embodied as a second pusher member, which is a replacement member to replace said first pusher member and to slidably support at said valve body, wherein said second pusher member is alignedly extended towards said second position of said flushing shaft, such that when said flush actuator is actuated to shift said second pusher member, said second pusher member is actuated to push at said second position of said flushing shaft to complete said flushing operation with a relatively low volume of water.

2. The flush system, as recited in claim 1, wherein a diameter of a second pusher end of said second pusher member is smaller than that of a first pusher end of said first pusher member.

3. The flush system, as recited in claim 2, wherein a length of said second pusher member matches with a length of said first pusher member.

4. The flush system, as recited in claim 2, wherein said second pusher member comprises an enlarged second biasing base actuated by said flush actuator and an elongated second driving member extended from said second biasing base at a position that said second pusher end of said second driving member is aligned to said second position of said flushing shaft.

5. The flush system, as recited in claim 3, wherein said second pusher member comprises an enlarged second biasing base actuated by said flush actuator and an elongated second driving member extended from said second biasing base at a position that said second pusher end of said second driving member is aligned to said second position of said flushing shaft.

6. The flush system, as recited in claim 4, wherein said second driving member has a body portion having a uniform diameter, and a free end portion coaxially extended from said body portion to define said second pusher end at said free end portion, wherein said free end portion has a uniform diameter smaller than said uniform diameter of said body portion to define a shoulder edge between said body portion and said free end portion of said second pusher member.

7. The flush system, as recited in claim 5, wherein said second driving member has a body portion having a uniform diameter, and a free end portion coaxially extended from said body portion to define said second pusher end at said free end portion, wherein said free end portion has a uniform diameter smaller than said uniform diameter of said body portion to define a shoulder edge between said body portion and said free end portion of said second pusher member.

8. The flush system, as recited in claim 1, wherein said flush actuator comprises an actuator handle operatively coupling with one of said first and second pusher members, and a valve locker detachably locking at an operation opening of said valve body for retaining said actuator handle thereat in a movable manner, such that said first and second pusher members are interchangeable when said valve locker is detached from said valve body.

9. The flush system, as recited in claim 2, wherein said flush actuator 5 comprises an actuator handle operatively coupling with one of said first and second pusher members, and a valve locker detachably locking at an operation opening of said valve body for retaining said actuator handle thereat in a movable manner, such that said first and second pusher members are interchangeable when said valve locker is detached from said valve body.

10. The flush system, as recited in claim 7, wherein said flush actuator comprises an actuator handle operatively coupling with one of said first and second pusher members, and a valve locker detachably locking at an operation opening of said valve body for retaining said actuator handle thereat in a movable manner, such that said first and second pusher members are interchangeable when said valve locker is detached from said valve body.

11. The flush system, as recited in claim 1, wherein said first position of said flushing shaft being pushed by said first pusher member is positioned above said second position of said flushing shaft being pushed by said second pusher member.

12. The flush system, as recited in claim 2, wherein said first position of said flushing shaft being pushed by said first pusher member is positioned above said second position of said flushing shaft being pushed by said second pusher member.

13. The flush system, as recited in claim 10, wherein said first position of said flushing shaft being pushed by said first pusher member is positioned above said second position of said flushing shaft being pushed by said second pusher member.

14. A method of for controlling flush water volume, comprising the steps of:
  (a) selectively coupling one of first and second pusher members at a valve body of a flush system, wherein said first and second pusher members are replaceable and interchangeable with each other, wherein said first and second pusher members have different sized configurations;
  (b) when said first pusher member is slidably coupled at said valve body, actuating a flush actuator to shift said first pusher member, wherein said first pusher member is actuated to push at a first position of a flushing shaft to complete a flushing operation with a relatively high volume of water;
  (c) replacing said first pusher member with said second pusher member to slidably couple at said valve body, wherein when said flush actuator is actuated to shift said second pusher member, said second pusher member is actuated to push at a second position of said flushing shaft to complete said flushing operation with a relatively low volume of water.

15. The method, as recited in claim 14, wherein the step (c) further comprises the steps of: (c.1) detaching a valve locker from said valve body to remove said first pusher member from said valve body; (c.2) interchanging said first pusher member with said second pusher member; and (c.3) re-coupling said valve locker back to said valve body to install said second pusher member into said valve body.

16. The method, as recited in claim 14, wherein a diameter of a second pusher end of said second pusher member is smaller than that of a first pusher end of said first pusher member.

17. The method, as recited in claim 15, wherein a diameter of a second pusher end of said second pusher member is smaller than that of a first pusher end of said first pusher member.

18. The method, as recited in claim 17, wherein said second pusher member comprises an enlarged second biasing base actuated by said flush actuator and an elongated second driving member extended from said second biasing base at a position that said second pusher end of said second driving member is aligned to said second position of said flushing shaft, wherein said second driving member has a body portion having a uniform diameter, and a free end portion coaxially extended from said body portion to define said second pusher end at said free end portion, wherein said free end portion has a uniform diameter smaller that said uniform diameter of said body portion to define a shoulder edge between said body portion and said free end portion of said second pusher member.

19. The method, as recited in claim 18, wherein each of said first and second pusher members is actuated through an arc-path movement of said flush actuator.

20. The method, as recited in claim 18, wherein each of said first and second pusher member is actuated through a depressible movement of said flush actuator.

21. A flush water volume control arrangement for a flush system which comprises a valve body, a valve seat supported in said valve body to move between a normal idle position and a flushing position, a flushing shaft being actuated to move said valve seat between said idle position and said flushing position, a pusher member slidably aligned with said flushing shaft, and a flush actuator detachably coupling with said valve body for shifting said pusher member to actuate said flushing shaft so as to complete a flushing operation with a predetermined volume of flush water, wherein said flush water volume control arrangement comprises:

a replacement member for replacing said pusher member and for being slidably coupled with said valve body, wherein said replacement member is interchangeable to replace said pusher member, wherein said replacement member has a sized configuration different from a sized configuration of said pusher member and is adapted for being actuated by said flush actuator to push at said flushing shaft so as to complete said flushing operation with a relatively low volume of water lower than said volume of flush water through said pusher member.

22. The flush water volume control arrangement, as recited in claim 21, wherein a diameter of a pusher end of said replacement member is smaller than that of a pusher end of said pusher member.

23. The flush water volume control arrangement, as recited in claim 22, wherein a length of said replacement member matches with a length of said pusher member.

24. The flush water volume control arrangement, as recited in claim 22, wherein said replacement member comprises an enlarged biasing base adapted for being actuated by said actuator handle, and an elongated driving member extended from said biasing base at a position that said pusher end of said replacement member is aligned to said flushing shaft.

25. The flush water volume control arrangement, as recited in claim 23, wherein said replacement member comprises an enlarged biasing base adapted for being actuated by said actuator handle, and an elongated driving member extended from said biasing base at a position that said pusher end of said replacement member is aligned to said flushing shaft.

26. The flush water volume control arrangement, as recited in claim 24, wherein said driving member has a body portion having a uniform diameter, and a free end portion coaxially extended from said body portion to define said pusher end at said free end portion, wherein said free end portion has a uniform diameter smaller that said uniform diameter of said body portion to define a shoulder edge between said body portion and said free end portion of said driving member.

27. The flush water volume control arrangement, as recited in claim 25, wherein said driving member has a body portion having a uniform diameter, and a free end portion coaxially extended from said body portion to define said pusher end at said free end portion, wherein said free end portion has a uniform diameter smaller that said uniform diameter of said body portion to define a shoulder edge between said body portion and said free end portion of said driving member.

28. The flush water volume control arrangement, as recited in claim 21, wherein said replacement member is actuated to shift for pushing at a position of said flushing shaft which is lower than a position of said flushing shaft being pushed by said pusher member.

29. The flush water volume control arrangement, as recited in claim 27, wherein said replacement member is actuated to shift for pushing at a position of said flushing shaft which is lower than a position of said flushing shaft being pushed by said pusher member.

30. The flush water volume control arrangement, as recited in claim 21, further comprising a replacement flush actuator for detachably coupling with said valve body, wherein said replacement flush actuator comprises an actuator handle operatively coupling with said replacement member, and a valve locker adapted for detachably locking at an operation opening of said valve body for retaining said actuator handle thereat in a movable manner, such that said replacement member is adapted for interchangeably replacing said pusher member when said valve locker is detached from said valve body.

31. The flush water volume control arrangement, as recited in claim 25, further comprising a replacement flush actuator for detachably coupling with said valve body, wherein said replacement flush actuator comprises an actuator handle operatively coupling with said replacement member, and a valve locker adapted for detachably locking at an operation opening of said valve body for retaining said actuator handle thereat in a movable manner, such that said replacement member is adapted for interchangeably replacing said pusher member when said valve locker is detached from said valve body.

32. The flush water volume control arrangement, as recited in claim 29, further comprising a replacement flush actuator for detachably coupling with said valve body, wherein said replacement flush actuator comprises an actuator handle operatively coupling with said replacement member, and a valve locker adapted for detachably locking at an operation opening of said valve body for retaining said actuator handle thereat in a movable manner, such that said replacement member is adapted for interchangeably replacing said pusher member when said valve locker is detached from said valve body.

* * * * *